US011287896B2

(12) United States Patent
Yang

(10) Patent No.: US 11,287,896 B2
(45) Date of Patent: Mar. 29, 2022

(54) DISPLAY APPARATUS AND CONTROL METHOD THEREOF

(71) Applicant: Samsung Electronics Co., Ltd., Suwon-si (KR)

(72) Inventor: Joonhyun Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/903,485

(22) Filed: Jun. 17, 2020

(65) Prior Publication Data

US 2021/0191520 A1 Jun. 24, 2021

(30) Foreign Application Priority Data

Dec. 23, 2019 (KR) .................. 10-2019-0173321

(51) Int. Cl.
  *G06F 3/01* (2006.01)
  *G09G 3/20* (2006.01)
  *G06T 3/60* (2006.01)
  *G09G 3/00* (2006.01)

(52) U.S. Cl.
  CPC .............. *G06F 3/017* (2013.01); *G06T 3/60* (2013.01); *G09G 3/00* (2013.01); *G09G 3/20* (2013.01); *G06F 2200/1614* (2013.01)

(58) Field of Classification Search
  None
  See application file for complete search history.

(56) References Cited

U.S. PATENT DOCUMENTS

| 9,497,509 B2 | 11/2016 | Mountain |
| 10,228,766 B2 | 3/2019 | Bhesania et al. |
| 10,587,903 B2 | 3/2020 | Park et al. |
| 11,132,537 B2 | 9/2021 | Park et al. |

(Continued)

FOREIGN PATENT DOCUMENTS

| JP | 2018-085573 A | 5/2018 |
| KR | 10-2007-0045006 A | 5/2007 |

(Continued)

OTHER PUBLICATIONS

International Search Report and Written Opinion of the International Searching Authority dated Sep. 3, 2020 in International Patent Application No. PCT/KR2020/005939.

*Primary Examiner* — Yi Wang
(74) *Attorney, Agent, or Firm* — Staas & Halsey LLP

(57) ABSTRACT

Displayed is a display apparatus and a control method thereof. A display apparatus includes a communicator including circuitry, a display, a one or more motors, a memory, and a processor. The processor is configured to, through the communicator, identify a user terminal apparatus present within a threshold distance of the display apparatus and receive a location and position information of the user terminal apparatus from the identified user terminal apparatus, identify a first angle of a yaw direction, a second angle of a roll direction, and a third angle of a pitch direction between the display and the user terminal apparatus, identify whether at least one of the first angle, the second angle, and the third angle exceeds a threshold, and control the one or more motors to move the display about an axis direction of the at least one angle by at least one move angle.

20 Claims, 11 Drawing Sheets

(56) References Cited

U.S. PATENT DOCUMENTS

| | | | |
|---|---|---|---|
| 2008/0259094 A1* | 10/2008 | Kim | G06F 3/0481 |
| | | | 345/651 |
| 2010/0295827 A1 | 11/2010 | Lim et al. | |
| 2012/0124525 A1 | 5/2012 | Kang | |
| 2012/0146906 A1 | 6/2012 | Song | |
| 2013/0177210 A1* | 7/2013 | Jeong | G06K 9/00248 |
| | | | 382/103 |
| 2013/0194394 A1 | 8/2013 | Shintani | |
| 2014/0111548 A1 | 4/2014 | Shin | |
| 2015/0324014 A1* | 11/2015 | Liao | G06F 3/0346 |
| | | | 345/156 |
| 2016/0316263 A1 | 10/2016 | Seo et al. | |
| 2016/0316264 A1 | 10/2016 | Seo et al. | |
| 2017/0111794 A1* | 4/2017 | Luckett, Jr. | H04L 63/0218 |
| 2018/0321892 A1* | 11/2018 | Kim | G06F 1/1618 |
| 2018/0330154 A1 | 11/2018 | Park et al. | |

FOREIGN PATENT DOCUMENTS

| | | | |
|---|---|---|---|
| KR | 10-0985217 | 10/2010 | |
| KR | 100985217 B1 * | 10/2010 | |
| KR | 10-1088083 B1 | 11/2011 | |
| KR | 10-2014-0050830 A | 4/2014 | |
| KR | 10-2014-0109473 A | 9/2014 | |
| KR | 10-1534806 | 7/2015 | |
| KR | 10-2016-0125295 | 10/2016 | |
| KR | 20160125295 A * | 10/2016 | ....... H04N 21/42202 |
| KR | 10-2014-0052984 A | 5/2017 | |
| KR | 10-2018-0057473 A | 5/2018 | |

* cited by examiner (a)

(b)

DISPLAY APPARATUS AND CONTROL METHOD THEREOF

CROSS-REFERENCE TO RELATED APPLICATION

This application is based on and claims priority under 35 U.S.C. § 119 to Korean patent application number 10-2019-0173321, filed on Dec. 23, 2019, in the Korean Intellectual Property Office, the disclosure of which is incorporated by reference herein in its entirety.

BACKGROUND

1. Field

The disclosure relates to a display apparatus and a control method thereof, more specifically to a display apparatus rotating a display based on location of a user terminal apparatus and position information and a control method thereof.

2. Description of Related Art

Recently, with the increase one-person households, a demand for personalized display apparatuses is growing and research on personalized display apparatuses is actively under progress. The personalized display apparatuses require improvements in performance, image quality, and sound quality more optimized under the condition of one viewer rather than a public environment setting of several viewers.

In addition, technology of rotating a display of a personalized display apparatus is being developed. However, when the display is rotated, there is the limitation of a user having to move to view the display at optimum viewing angles.

SUMMARY

According to an embodiment, a display apparatus includes a communicator including circuitry, a display, a one or more motors for rotating the display, a memory, and a processor, and the processor is configured to, through the communicator, identify a user terminal apparatus present within a threshold distance of the display apparatus and receive a location and position information of the user terminal apparatus from the identified user terminal apparatus, identify a first angle of a yaw direction, a second angle of a roll direction, and a third angle of a pitch direction between the display and the user terminal apparatus based on at least one of the location information and the position information of the user terminal apparatus, identify whether at least one angle of the first angle, the second angle, and the third angle exceeds a threshold, and based on the at least one angle being identified as exceeding the threshold, control the one or more motors to pivot the display about an axis direction of the at least one angle by the at least one angle.

According to an embodiment, a control method of a display apparatus including one or more motors for rotating a display includes identifying a user terminal apparatus present within a threshold distance of the display apparatus and receiving a location information and a position information of the user terminal apparatus from the identified user terminal apparatus, verifying a first angle of a yaw direction, a second angle of a roll direction, and a third angle of a pitch direction between the display and the user terminal apparatus based on at least one of the location information and the position information of the user terminal apparatus, identifying whether at least one angle of the first angle, the second angle, and the third angle exceeds a threshold, and based on the at least one angle being identified as exceeding the threshold, controlling the one or more motors to pivot the display about an axis direction of the at least one angle by the at least one angle.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
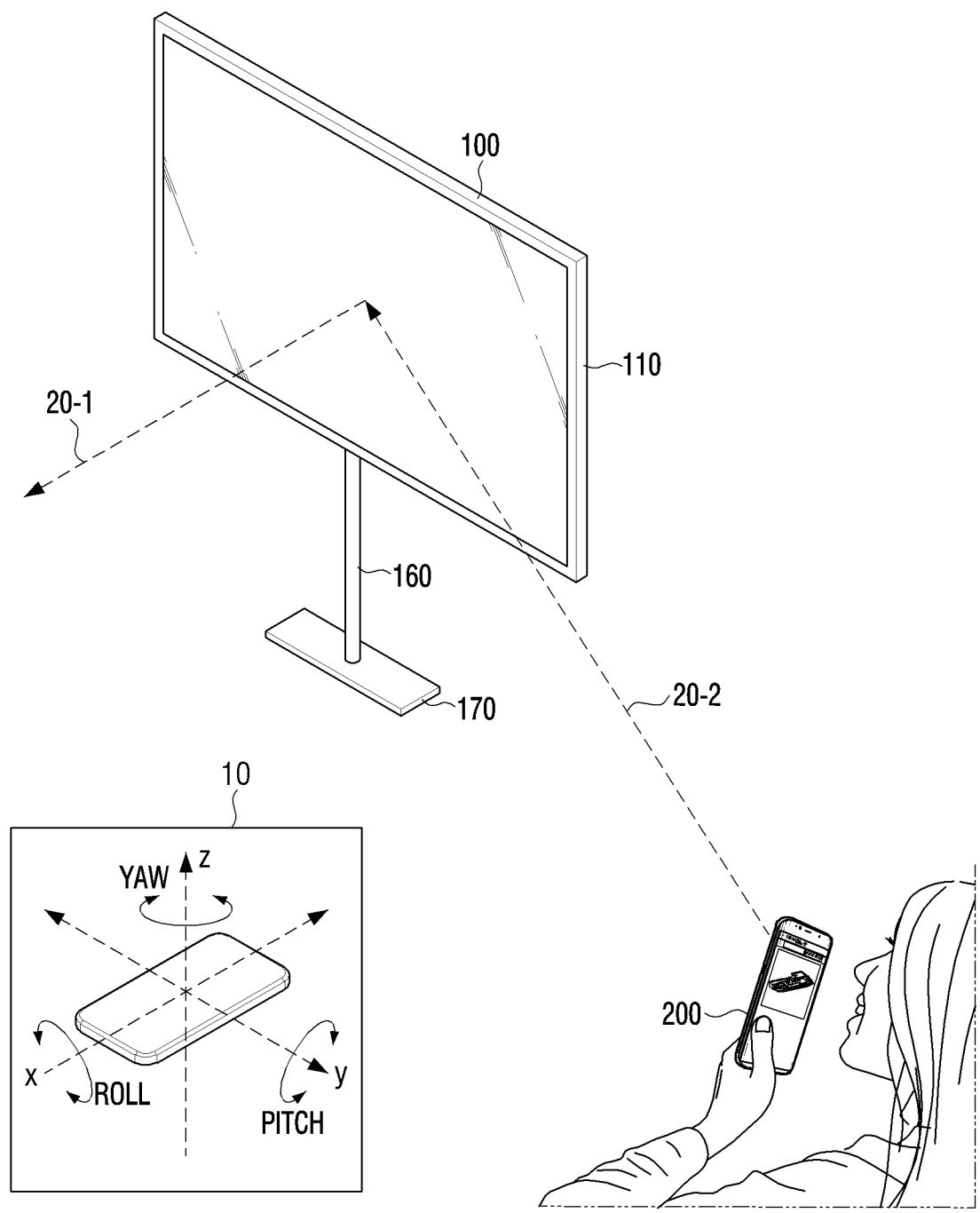
FIG. 1A is a diagram illustrating a display apparatus and a control method of a user terminal apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not intended to limit the scope of the disclosure to a specific embodiment, but should be interpreted to include various modifications, equivalents or alternatives of the embodiments of the disclosure. In the drawings, like reference numerals may be used to indicate like elements.

In addition, the various embodiments below may be modified to a variety of different forms, and it should be noted that the various embodiments are not for limiting the scope of the disclosure to a specific embodiment. Rather, the embodiments are provided so that the disclosure may be thorough and complete, and to fully convey the technical idea of the disclosure to those skilled in the art.

The terms used herein are merely used to describe a specific embodiment, and are not intended to limit the scope of the disclosure. Singular expressions may include plural expressions, unless otherwise specified.

In the disclosure, expressions such as "comprise," "may comprise," "consist of," "may consist of," or the like are used to designate a presence of a corresponding characteristic (e.g., elements such as numerical value, function, operation, or component, etc.), and not to preclude a presence or a possibility of additional characteristics In the disclosure, expressions such as "A or B," "at least one of A and/or B," or "one or more of A and/or B" should be understood to include all possible combinations of the items listed together. For example, "A or B," "at least one of A and B," or "at least one of A or B" should be understood to represent all cases including (1) at least one of A, (2) at least one of B, or (3) at least one of A and at least one of B.

Expressions such as "first" and "second" as used herein may denote various elements, regardless of order and/or importance, may be used to distinguish one element from another, and does not limit the corresponding elements.

Based on an element (e.g., first element) being indicated as being "(operatively or communicatively) coupled with/to" or "connected to" another element (e.g., second element), it is to be understood that an element may be directly coupled with/to another element or may be coupled through still another element (e.g., third element). On the other hand, when an element (e.g., first element) is indicated as being "directly coupled with/to" or "directly connected to" another element (e.g., second element), it is to be understood that a still another element (e.g., third element) may not be present between the element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may be configured with . . . " together with another device or components. For example, the phrase "a processor configured to (or set up to) perform A, B, or C" may mean a processor dedicated to perform a corresponding operation (e.g., embedded processor), or a generic-purpose processor (e.g., a central processing unit (CPU) or an application processor) capable of performing the corresponding operations by executing one or more software programs stored in the memory device.

The disclosure has been devised based on the above-described necessity, and the disclosure relates a display apparatus that moves, rotates (or, pivots) a display based on a received location information and a position information of a user terminal apparatus when the location information and the position information of the user terminal apparatus is received from the user terminal apparatus and a control method thereof.

Figure 1B:
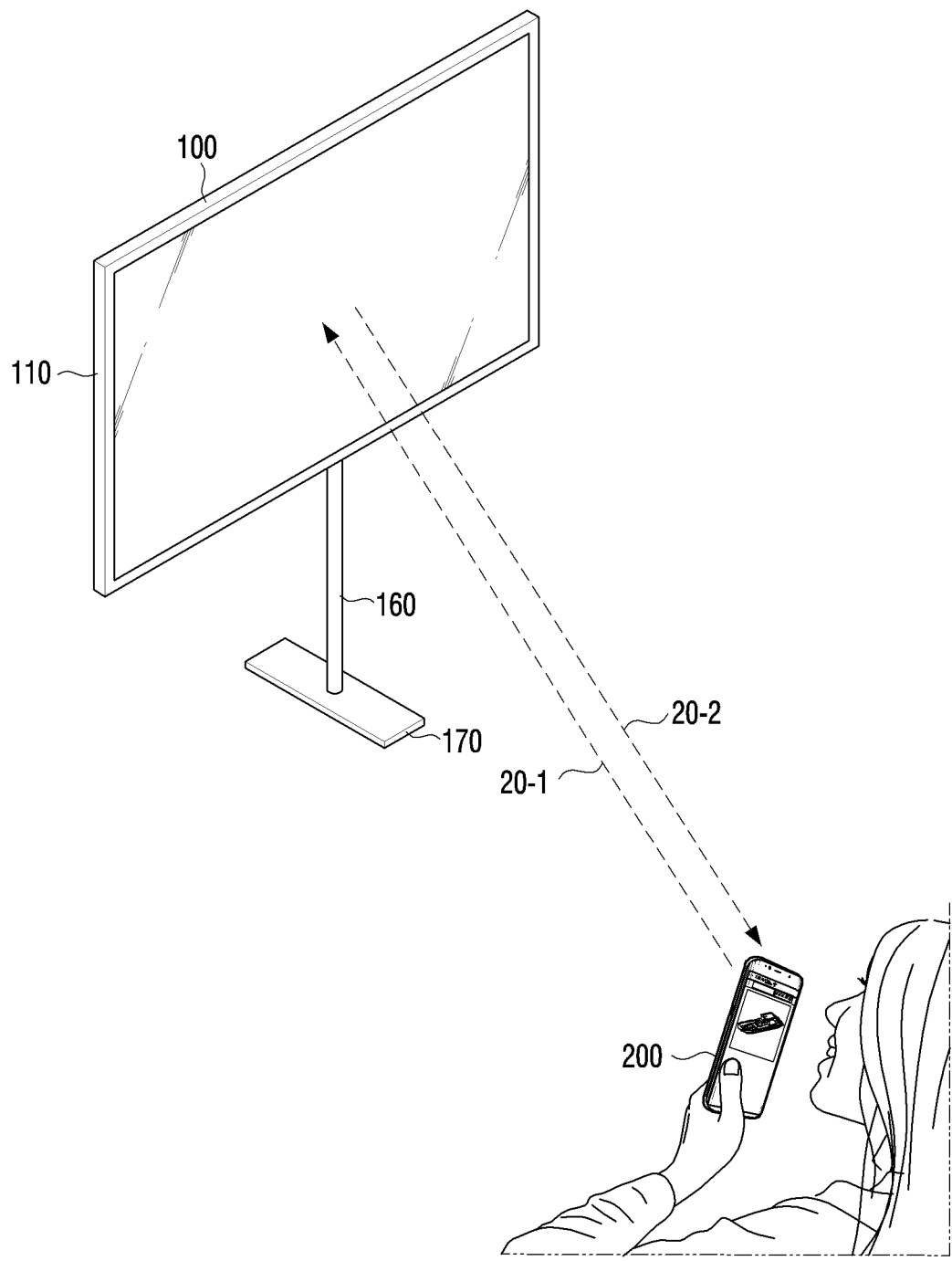
FIG. 1B is a diagram illustrating a display apparatus and a control method of a user terminal apparatus according to an embodiment of the disclosure.
Figure 1C:
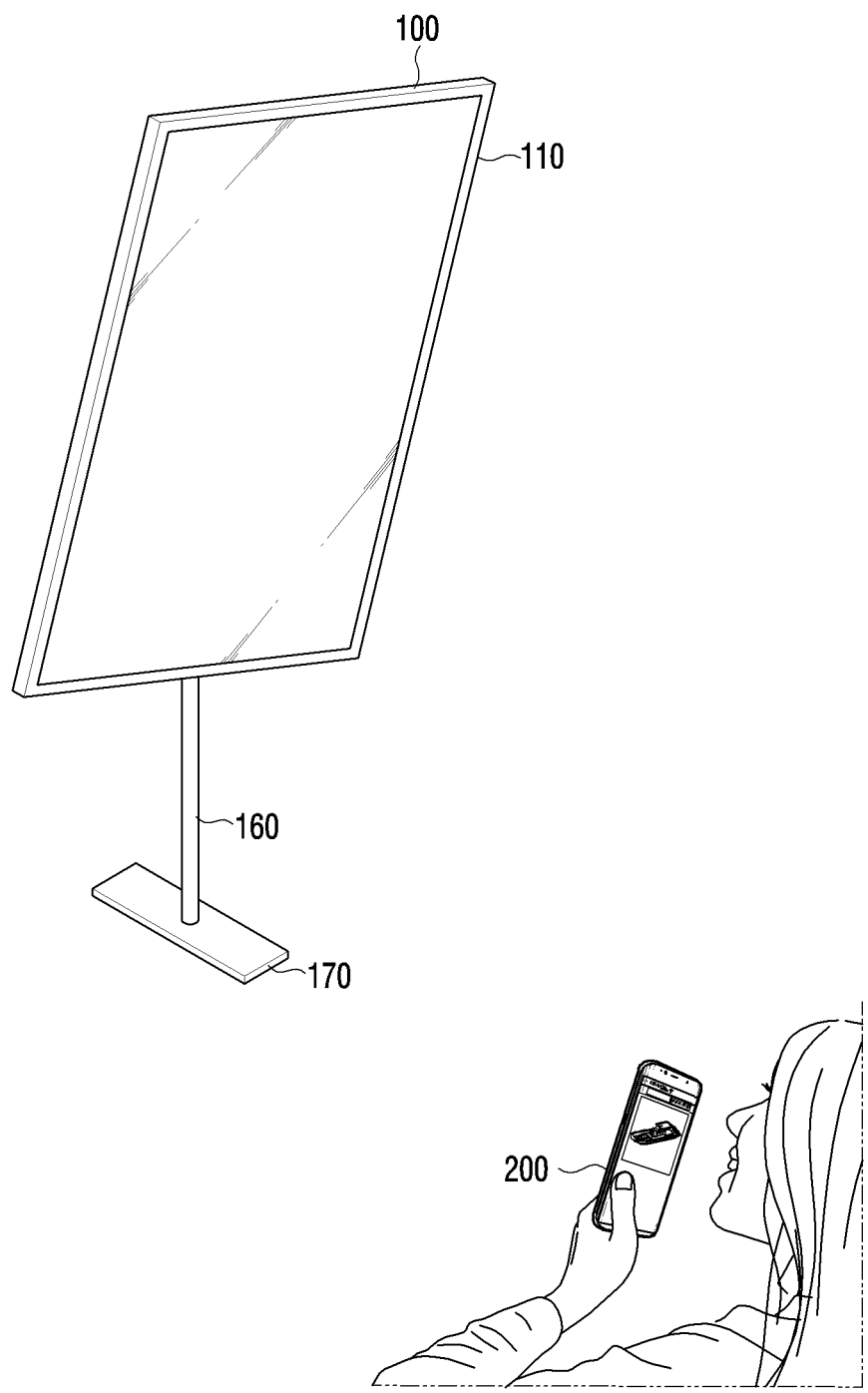
FIG. 1C is a diagram illustrating a display apparatus and a control method of a user terminal apparatus according to an embodiment of the disclosure.

The disclosure will be described in greater detail below with reference to the attached drawings. FIGS. 1A to 1C are diagrams illustrating a control method of a display apparatus 100 according to an embodiment of the disclosure.

As illustrated in FIG. 1A, the display apparatus 100 may identify the user terminal apparatus 200 present within a threshold distance of the display apparatus 100, and receive the location information and the position information of the user terminal apparatus 200 from the identified user terminal apparatus 200. For example, the display apparatus 100 may use a Bluetooth Beacon included in a communicator 120 (e.g., communicator comprising circuitry) to identify the user terminal apparatus 200 present within the threshold distance with the display apparatus 100. Further, the display apparatus 100 may, while identifying the user terminal apparatus 200 present within the threshold distance of the display apparatus 100 using the Bluetooth Beacon, transmit a signal requesting the location information and the position information of the user terminal apparatus 200 to the user terminal apparatus 200. The display apparatus 100 may then receive the location information and the position information of the user terminal apparatus 200 from the user terminal apparatus 200.

The display apparatus 100 may use the Bluetooth Beacon to identify the user terminal apparatus 200 present within the threshold distance of the display apparatus 100 while estimating and identifying a location of the user terminal apparatus 200 simultaneously or within a threshold time range. For example, the display apparatus 100 may use the strength of a signal output from the Bluetooth Beacon or the time taken from the signal being reflected from the user terminal apparatus 200 and returning back to the Beacon to estimate and identify a relative location of the user terminal apparatus 200 based on the distance between the display apparatus 100 and the user terminal apparatus 200 and the display apparatus 100.

According to another embodiment, if the user terminal apparatus 200 is tagged to a near field communication (NFC) tag including information (e.g., MAC address of the display apparatus 100, a plurality of connection information capable of communication connection with the display apparatus 100) on the display apparatus 100, the display apparatus 100 may perform pairing with the user terminal apparatus 200. Further, while being paired with the user terminal apparatus 200, the display apparatus 100 may use the NFC module to transmit a signal requesting the location information and the position information of the user terminal apparatus 200 to the user terminal apparatus 200. The display apparatus 100 may then receive the location information and the position information of the user terminal apparatus 200 from the user terminal apparatus 200. The NFC tag included with information on the display apparatus 100 may also be included in a remote control controlling the display apparatus 100.

According to still another embodiment, the display apparatus 100 may identify that the user terminal apparatus 200 is present within the threshold distance of the display apparatus 100 based on a communication history stored in the display apparatus 100. Specifically, the display apparatus 100 may store information (e.g., information on MAC address of the user terminal apparatus 200, etc.) on the user terminal apparatus 200 in which communication connection has been performed as communication history information. In one embodiment, the display apparatus 100 may store a Bluetooth MAC address information on the user terminal apparatus 200 paired through a Bluetooth connection method. Based on the user terminal apparatus 200 recorded in the communication history coming within the threshold distance, the display apparatus 100 may perform communication connection with the user terminal apparatus 200 based on information on the stored MAC address. The display apparatus 100 may then transmit a signal requesting the location information and the position information of the user terminal apparatus 200 to the user terminal apparatus 200.

According to still another embodiment, the display apparatus 100 may receive a signal indicating that the rotation of the display 110 may be controlled from the user terminal apparatus 200 in communication connection, and may receive the location information and the position information of the user terminal apparatus 200 simultaneously or within an error range of a threshold time. That is, the display apparatus 100 may receive the location information and the position information of the user terminal apparatus 200 from the user terminal apparatus 200 input with a user command after communication is connected with the user terminal apparatus 200.

The user terminal apparatus 200 may include at least one of, for example, a smartphone, a tablet personal computer (PC), a laptop PC, a netbook computer, a mobile medical device, and a wearable device, but is not limited thereto. Accordingly, although FIGS. 1A to 1C illustrate an embodiment of the user terminal apparatus 200 being implemented as a smartphone, the embodiment is not limited thereto.

In addition, the position information of the user terminal apparatus 200 may refer to information on a current position of the user terminal apparatus 200 obtained through an acceleration sensor, a gyro sensor, or the like of the user terminal apparatus 200. The current position of the user terminal apparatus 200 may be represented in a roll angle, a pitch angle, and a yaw angle. As illustrated in a three-dimensional coordinate system 10, the roll angle may be a rotating angle about an X-axis, the pitch angle may be a rotating angle about a Y-axis, and the yaw angle may be a rotating angle about a Z-axis. Because the process of the user terminal apparatus 200 obtaining position information through the acceleration sensor and the gyro sensor is known in the art, a detailed description thereof will be omitted.

The display apparatus 100 may verify a first angle of the yaw direction, a second angle of the roll direction and a third angle of the pitch direction between the display 110 and the user terminal apparatus 200 based on at least one of the location information and the position information received from the user terminal apparatus 200. The display apparatus 100 may then identify whether at least one angle of the first angle, the second angle and the third angle exceeds a threshold. The threshold corresponding to the first angle to the third angle may be the same value, but this is merely one embodiment. For example, a first threshold value, a second threshold value, and a third threshold value corresponding to the first angle, the second angle and the third angle respectively may be of different values, and may be differently implemented according to a type of the display apparatus 100. In addition, each threshold may be changed by a user command.

Specifically, the display apparatus 100 may use a location of the user terminal apparatus 200 to verify the first angle of the yaw direction between the display 110 and the user terminal apparatus 200. More specifically, the display apparatus 100 may identify a front direction (or, a normal vector 20-1 direction of a center area of the display 110) from a center area of the display 110 through information on the direction of the pre-stored current display 110. The display apparatus 100 may then verify an angle of the yaw direction from an angle between the front direction 20-1 from the center area of the display 110 and a direction 20-2 from the center area of the display to the user terminal apparatus 200. The angle of the yaw direction may refer to an angle of when the angle between the front direction 20-1 from the center area of the display 110 and the direction 20-2 from the center area of the display to the user terminal apparatus 200 is projected to the surface. The display apparatus 100 may then identify whether the first angle exceeds the first threshold value.

The display apparatus 100 may identify the roll angle and the pitch angle of the user terminal apparatus 200 through the position information received from the user terminal apparatus 200. The display apparatus 100 may then use the roll angle of the identified user terminal apparatus 200 to verify the second angle of the roll direction between the display 110 and the user terminal apparatus 200. Simultaneously thereto or within the threshold time range, the display apparatus 100 may use the identified pitch angle to verify the third angle of the pitch direction between the display 110 and the user terminal apparatus 200. That is, the display apparatus 100 may verify as to what degree of angle the display 110 is to rotate (or, pivot) about the roll direction axis or the pitch direction axis for the position of the display 110 to be the same or similar with the position of the user terminal apparatus 200. The display apparatus 100 may then identify whether the second angle and the third angle exceeds the second threshold value and the third threshold value respectively.

Based on at least one angle of the first angle, second angle and the third angle being identified as exceeding the threshold, the display apparatus 100 may then control a first motor to rotate the display 110 about an axis direction of at least one angle by the at least one angle. The display apparatus 100 and the display 110 may be supported on a stand and a base. While an embodiment includes the stand and base, the present invention is not limited to any particular number or type of support.

As illustrated in FIG. 1B, when the first angle is identified as exceeding the first threshold value, the display apparatus 100 may control the first motor for the display 110 to rotate (or, pivot) about the yaw direction by the first angle. That is, as illustrated in FIG. 1B, the display apparatus 100 may control one or more motors to rotate (or, pivot) the display 110 so that the front direction 20-1 from the center area of the display 110 and the direction 20-2 from the user terminal apparatus 200 to the center area of the display is parallel or coincident with respect to the surface. According to still another embodiment, the display apparatus 100 may control a second motor to rotate (or, pivot) the display 110 and a second support supporting one or more motors by the first angle in the yaw direction for the display 110 to rotate (or, pivot) at a top surface of a first support 160. Accordingly, the display apparatus 100 may, based on rotating the second support about the yaw-axis direction, derive the same effect as rotating the display 110 about the yaw-axis direction.

As illustrated in FIG. 1C, if the second angle is identified as exceeding the second threshold value while the display is rotated about the yaw-axis direction by the first angle, the display apparatus 100 may control the first motor to rotate (or, pivot) the display 110 about the roll-axis direction by the second angle. When the third angle is identified as exceeding the third threshold, the display apparatus 100 may control the first motor to rotate (or, pivot) the display 110 about the pitch-axis direction by the third angle. That is, the display apparatus 100 may be controlled so that the position of the display 110 and the position of the user terminal apparatus 200 is the same or similar by rotating the display 110 based on the position information of the user terminal apparatus 200.

Referring to FIGS. 1B and 1C, after the display apparatus 100 rotates (or, pivots) the display about the yaw-axis direction by the first angle, an embodiment of rotating about the roll-axis direction and the pitch-axis direction has been disclosed, but this is merely one embodiment. For example, the display apparatus 100 may rotate (or, pivot) the display 110 in the order of the yaw direction, the roll direction, and the pitch direction, or may rotate (or, pivot) simultaneously. That is, the order of the direction the display is rotated may be variously determined.

According to an embodiment, when at least one of the first angle, the second angle, and the third angle is identified as exceeding the threshold, the display apparatus 100 may display a user interface (UI) inquiring whether to rotate (or, pivot) the display 110. When a command to not rotate (or, pivot) the display 110 is input through the UI, the display apparatus 100 may, by maintaining a current angle of the display 110, prevent the display 110 from being rotated, which would be different from the intention of a user.

According to another embodiment, when the user command to fix the display 110 is input, the display apparatus 100 may control the first motor or the second motor to maintain the angle of the rotated display 110. For example, based on a voice of the user to stop the display 110 rotation being input from the user after being rotated for the front direction of the display 110 and a view 20 direction of the user to coincide, the display apparatus 100 may stop the rotation of the display 110 for the angle of the current display 110 to be maintained.

In another example, based on the user command stopping the rotation of the display 110 being input through the UI capable of controlling the rotation of the display 110, the display apparatus 100 may stop the rotation of the display 110 for the angle of the display to be maintained. Accordingly, the display apparatus 100 may, based on either inquiring whether to rotate (or, pivot) the display to the user or receiving the user command related with the display 110, prevent the display 110 from being rotated differently from the intention of the user.

Further, in an embodiment, when a distance between the user terminal apparatus 200 and the display apparatus 100 exceeds the threshold distance, the display apparatus 100 may display a pre-set idle screen. In an embodiment, when the distance with the user terminal apparatus 200 exceeds the threshold distance causing communication connection between the user terminal apparatus 200 from being performed or the speed of communication becoming less than the pre-set value, an operation mode of the display apparatus 100 may be converted to a power-save mode and the pre-set idle screen may be displayed. Accordingly, the display apparatus 100 may, by performing the power-save mode based on the distance between the user terminal apparatus 200 and displaying the pre-set idle screen, reduce power consumption.

Figure 2A:
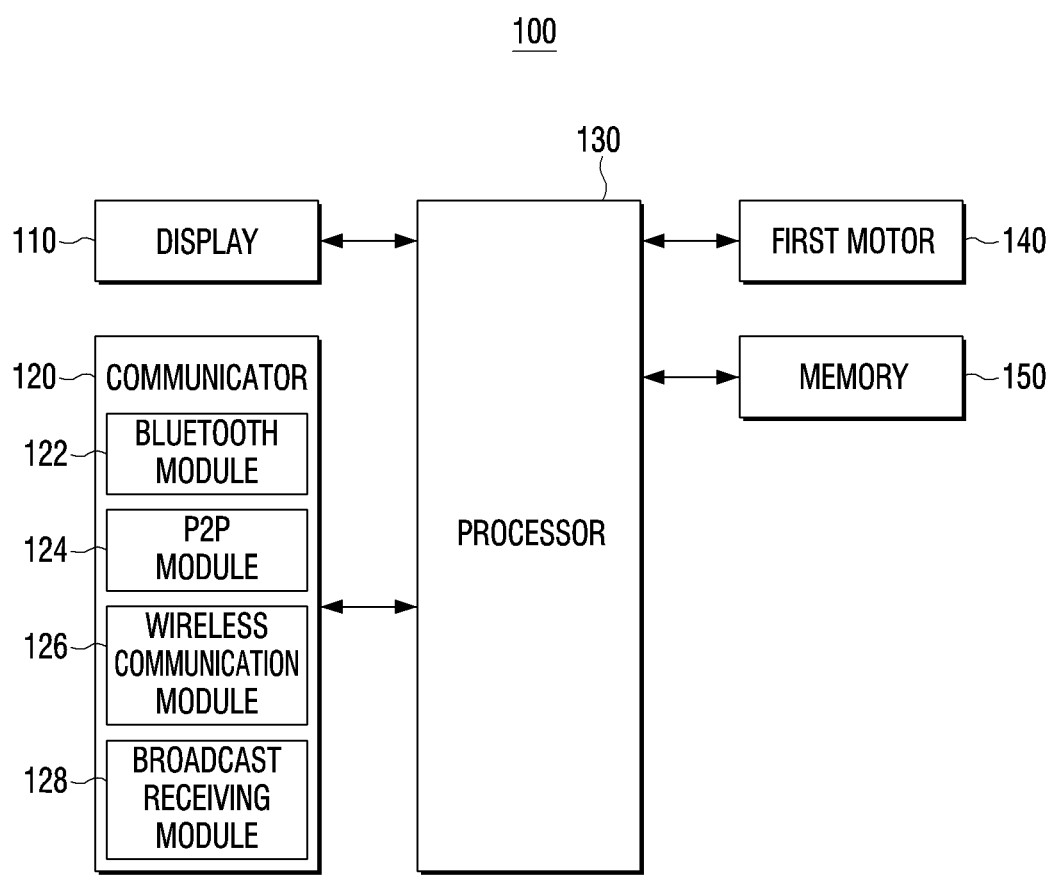
FIG. 2A is a block diagram briefly illustrating a configuration of a display apparatus according to an embodiment of the disclosure.

FIG. 2A is a block diagram briefly illustrating a configuration of a display apparatus 100 according to an embodiment of the disclosure. As illustrated in FIG. 2A, the display apparatus 100 may include a communicator 120 (e.g. communicator comprising circuitry), a processor 130, a first motor 140, and a memory 150. However, the embodiment is not limited to the above-described configurations, and some configurations may be added or omitted based on a type of the display apparatus 100.

The display 110 may display various information according to a control of the processor 130. In an embodiment, the display 110 may display the UI inquiring whether to rotate (or, pivot) the display according to the control of the processor 130. In still another embodiment, the display 110 may display the pre-set idle screen according to the control of the processor 130.

In addition, the display 110 may be implemented as a touch screen together with a touch panel, but this is merely one embodiment, and a panel of the display may be implemented in various display technologies such as liquid crystal display (LCD), organic light emitting diodes (OLED), active-matrix organic light-emitting diode (AM-OLED), liquid crystal on silicon (LcoS), quantum dot light-emitting diode (QLED), digital light processing (DLP), and the like.

The communicator 120 may perform communication connection with the user terminal apparatus 200 using various methods. The communicator 120 performing communication connection with the user terminal apparatus 200 may include communication via a third device (e.g., a relay device, a hub, an access point, a server, a gateway, etc.).

The communicator 120 may then include various communication modules for performing communication connection with the user terminal apparatus 200. For example, as illustrated in FIG. 2A, the communicator 120 may include a Bluetooth module 122, a peer-to-peer (P2P) module 124, a wireless communication module 126, and a broadcast receiving module 128.

The Bluetooth module 122 may be a module performing communication connection with user terminal apparatus 200 through a Bluetooth low energy (BLE) method. The Bluetooth may be a wireless communication method using an industrial scientific and medical (ISM) frequency band (e.g., 2402-2480 MHz). The Bluetooth module 122 may receive various information from the user terminal apparatus 200.

The Bluetooth module 122 may include the Bluetooth Beacon capable of identifying whether the user terminal apparatus 200 is present within the threshold distance of the display apparatus 100. The Bluetooth Beacon may transmit a signal requesting the location information and the position information of the user terminal apparatus 200 to the user terminal apparatus 200 present within the threshold distance of the display apparatus 100.

The P2P module 124 may be a module performing communication connection with the user terminal apparatus 200 through the P2P communication method. In an embodiment, the P2P module 124 may utilize a Wi-Fi Direct, which is a Wi-Fi-based P2P standard, to perform communication connection with the user terminal apparatus 200 without separate equipment such as an access point (AP) or a router. In addition, the P2P module 124 may receive information on the location and position of the user terminal apparatus from the user terminal apparatus 200.

The wireless communication module 126 may include a cellular communication module using, for example, at least one of a long term evolution (LTE), LTE advance (LTE-A), code division multiple access (CDMA), wideband CDMA (WCDMA), wireless broadband (WiBro), global system for mobile communications (GSM), 5th generation (5G), or the like.

In still another example, the wireless communication module 126 may include the NFC communication module including the NFC tag that stores information (e.g., MAC address of the display apparatus 100, Bluetooth MAC address, etc.) on the display apparatus 100. The NFC tag may include an integrated circuit (IC) and an antenna coil. When the user terminal apparatus 200 provided with an NFC reader is tagged with the NFC tag and accessed short-range, the NFC tag may be driven by the electromagnetic waves emitted from the NFC reader, and an RF signal containing information on the display apparatus 100 recorded within the NFC tag may be transmitted to the user terminal apparatus 200.

Specifically, in the antenna coil within the NFC tag, current may be induced by electromagnetic waves emitted from the NFC reader. The induced current may be charged by a capacity provided in the NFC tag. The antenna coil in the NFC tag may then be composed as a conductor wound several times in a quadrangular or circular shape. The IC may be driven by the currents changed to the capacitor to generate the RF signal by modulating and coding information stored in the memory within the IC.

The first motor may be an element capable of freely rotating the display 110 in a yaw direction, roll direction, and pitch direction, that is, three-dimensionally by the control of the processor 130. That is, the first motor 140 may rotate (or, pivot) the display 110 in a roll direction, yaw direction, and pitch direction by the control of the processor 130.

The first motor 140 may be configured with one or more motors. The first motor 140 may then be coupled to the back surface of the display 110 and rotate (or, pivot) the display 110, but this is merely one embodiment.

The memory 150 may store instructions related to at least one other element of the display apparatus 100, information on the current angle of the display 110, information on the three-dimensional coordinate system identified based on the display 110, and information on communication history (e.g., information on the user terminal apparatus 200 that performed communication connection with the display apparatus 100).

Further, the memory 150 may be implemented as a non-volatile memory, a volatile memory, a flash-memory, a hard disk drive (HDD), a solid-state drive (SSD), or the like. The memory 150 may be accessed by the processor 130, and reading, writing, modifying, deleting, updating, or the like of the data may be performed by the processor 130. The term memory used herein may include the memory 150, a read-only memory (ROM; not shown) in the processor 130, a memory card (not shown) mounted to a random-access memory (RAM; not shown) or the display apparatus 100 (e.g., a micro secure digital (micro SD) card, a memory stick, etc.). In addition, the memory 150 may store programs, data, and the like for constituting various screens to be displayed on a display area of the display 110.

The processor 130 may be electrically connected with the memory 150 to control the overall operations and functions of the display apparatus 100. The processor 130 may identify the user terminal apparatus 200 present within the threshold distance of the display apparatus 100 through the communicator 120, and receive the location information and the position information of the user terminal apparatus 200 from the user terminal apparatus 200. The processor 130 may identify the location of the user terminal apparatus 200 present within the threshold distance of the display apparatus 100 using the Bluetooth Beacon from the communicators 120, while transmitting a signal requesting the location information and the position information of the user terminal apparatus 200 to the user terminal apparatus 200 simultaneously or within the threshold time range.

The processor 130 may verify the first angle of the yaw direction, the second angle of the roll direction, and the third angle of the pitch direction between the display 110 and the user terminal apparatus 200 based on at least one of the location information and the position information of the user terminal apparatus 200.

The processor 130 may use the location of the user terminal apparatus 200 to verify the first angle of the yaw direction between the display 110 and the user terminal apparatus 200. More specifically, the processor 130 may verify the angle of the yaw direction from the angle between the front direction (or, normal vector direction) of the center area of the display 110 and the direction from the center area of the display 110 to the location of the user terminal apparatus 200. The angle of the yaw direction may refer to the angle when the angle between the front direction (or, normal vector direction) of the center area of the display 110 and the direction from the center area of the display 110 to the location of the user terminal apparatus 200 is projected on the surface.

The processor 130 may identify the roll angle and the pitch angle of the user terminal apparatus 200 through the position information, and use the identified roll angle and the identified pitch angle to verify the angle of the roll direction and the pitch direction between the display 110 and the user terminal apparatus 200. For example, the position information may, as information on the position of the user terminal apparatus 200 obtained through various sensors such as an acceleration sensor and gyro sensor of the user terminal apparatus 200, be described as the roll angle, the pitch angle, and the like. Accordingly, the processor 130 may use information on the position to verify the second angle of the roll direction between the current display 110 and the user terminal apparatus 200, and verify the third angle of the pitch direction.

The processor 130 may then identify whether the angle of at least one of the first angle, the second angle, or the third angle exceeds the threshold. The threshold corresponding to each angle may be the same value, but this is merely one embodiment, and the threshold may be realized as a different value corresponding to each angle. In addition, the threshold may be changed by the user.

If at least one angle is identified as exceeding the threshold, the processor 130 may control the first motor 140 to rotate (or, pivot) the display about the axis direction of the identified at least one angle by at least one angle.

In an embodiment, if the first angle is identified as exceeding the first threshold value, the processor 130 may control the first motor 140 to rotate (or, pivot) the display 110 about the yaw-axis direction by the first angle. In still another embodiment, if the first angle is identified as exceeding the first threshold value, the processor 130 may control the second motor to rotate (or, pivot) the second support 170 supporting the display 110 and the first motor 140 about the yaw-axis direction for the display 110 to rotate (or, pivot) at the top surface of the first support 160 by the first angle.

In addition, if the second angle exceeds the second threshold value, the processor 130 may control the first motor 140 to rotate (or, pivot) the display 110 about the roll-axis direction by the second angle. Further, if the third angle exceeds the third threshold, the processor 130 may control the first motor 140 to rotate (or, pivot) the display 110 about the pitch-axis direction by the third angle.

The processor 130 may rotate (or, pivot) the display 110 in the order of the yaw direction, the roll direction and the pitch direction, but this is merely one embodiment, and may control the first motor to rotate (or, pivot) simultaneously. That is, the processor 130 may variously determine the order of the direction rotating the display.

Further, when at least one of the first angle, the second angle and the third angle is identified as exceeding the threshold, the processor 130 may control the display 110 to display the UI inquiring whether to rotate (or, pivot) the display 110. Based on the user command to rotate (or, pivot) the display 110 being input through the UI, the processor 130 may rotate (or, pivot) the display about the axis direction of the angle of at least one of the first angle, the second angle, and the third angle exceeding the threshold.

When the user command to fix the display is input after the display 110 is rotated by the angle identified as exceeding the threshold, the processor 130 may control the display 110 to maintain the angle of the display 110. In an embodiment, the processor 130 may receive the user command to maintain the angle of the display from the user terminal apparatus 200 through the communicator 120. In still another embodiment, the processor 130 may also receive input of the user command to maintain the angle of the display through the remote control controlling the display apparatus 100.

When the user terminal apparatus 200 is identified as exceeding the threshold distance of the display apparatus 100, the processor may control the display 110 to display the pre-set idle screen. For example, in case the user terminal apparatus 200 does not perform communication connection with the display apparatus 100 for exceeding the threshold distance or when the speed of communication has become less than the pre-set value, the processor 130 may convert the mode of the display apparatus 100 to the power-save mode and control the display 110 to display the pre-set idle screen. In terms of the situation of the user terminal apparatus 200 exceeding the threshold distance of the display apparatus 100 including the situation of the user not using the display apparatus 100, the display apparatus 100 may prevent unnecessary power consumption through the above-described embodiment.

After the display 110 is rotated by the angle identified as exceeding the threshold, the processor 130 may receive information on a facial angle of the user from the user terminal apparatus 200 through the communicator 120. The processor 130 may then control the first motor 140 to rotate (or, pivot) the display 110 based on information on the facial angle of the user. The user terminal apparatus 200 may detect whether the facial angle of the user is changed through the image of the user's face obtained through a camera, and the like. Based on receiving information that the facial angle of the user has been rotated about the roll-axis direction or the pitch-axis direction from the user terminal apparatus 200, the processor 130 may rotate (or, pivot) the display 110 based on the received information. The specific embodiment will be described in greater detail with reference to FIGS. 3A and 3B.

When the location of the user terminal apparatus 200 is maintained during the pre-set time after the user terminal apparatus 200 is identified as being present within the threshold distance of the display apparatus 100, the processor 130 may control the first motor 140 to rotate (or, pivot) the display 110 about the axis direction of the angle exceeding the threshold by the angle exceeding the threshold. That is, because the situation of the location of the user terminal apparatus 200 being maintained during the pre-set time may include the situation of the user viewing the display apparatus 100, the processor 130 may, by rotating the first motor to rotate (or, pivot) the display 110 based on the location and position of the user terminal apparatus 200, more clearly identify the intention of the user. In the embodiment above, based on the first angle of the yaw direction between the display 110 and the user terminal apparatus 200 exceeding the threshold, the processor 130 may control the second motor to rotate (or, pivot) the second support 170 about the yaw-axis direction by the first angle.

The processor 130 may either include one or more of a central processing unit (CPU) processing a digital signal, a micro controller unit (MCU), a micro processing unit (MPU), a controller, an application processor (AP), a communication processor (CP), an ARM processor, or the like, or may be designated by the corresponding term. In addition, the processor 130 may be implemented as a system of chip (SoC) embedded with a processing algorithm and a large scale integration (LSI), or implemented in the form of a field programmable gate array (FPGA). The processor 130 may perform various functions by executing computer executable instructions stored in the memory 150. In addition, the processor 130 may include at least one of a graphics-processing unit (GPU) which is a separate artificial intelligence (AI) dedicated processor, a neural processing unit (NPU), or a visual processing unit (VPU).

Figure 2B:
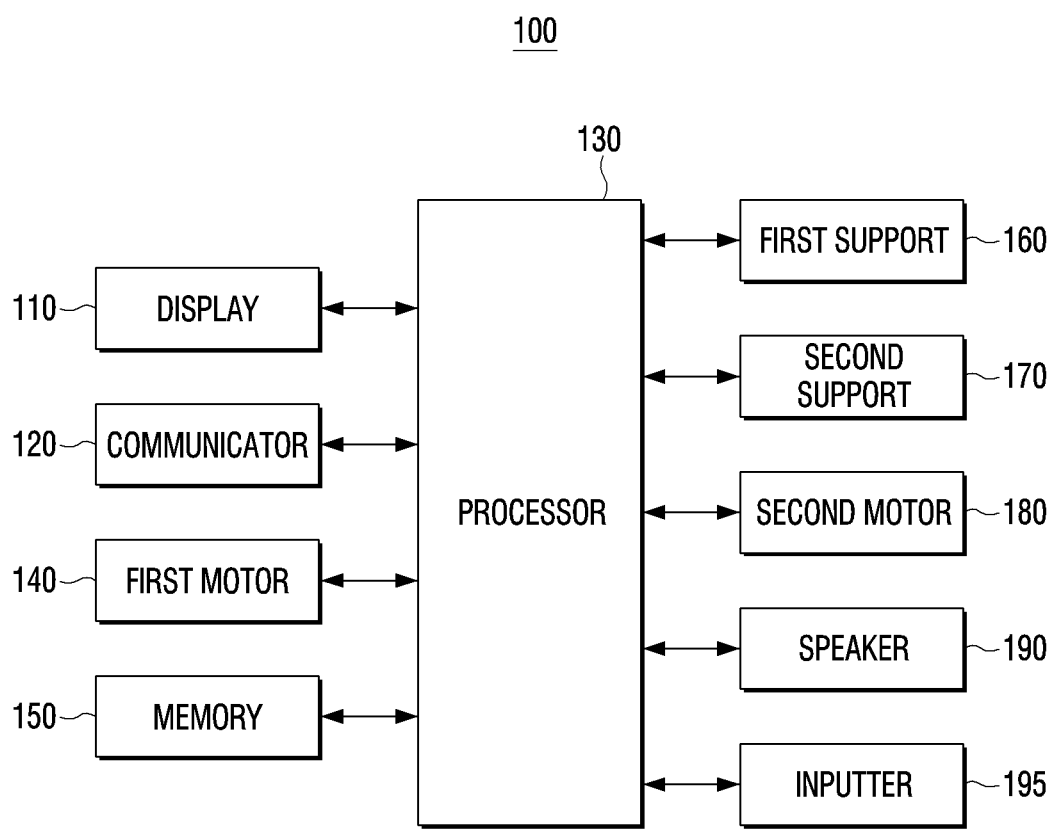
FIG. 2B is a block diagram illustrating in detail a configuration of a display apparatus according to an embodiment of the disclosure.

FIG. 2B is a block diagram illustrating in detail a configuration of a display apparatus 100 according to an embodiment of the disclosure. As illustrated in FIG. 2B, the display apparatus may include the display 110, the communicator 120 (e.g., communicator comprising circuitry), the processor 130, the first motor 140, the memory 150, the first support 160, the second support 170, a second motor 180, a speaker 190, and an inputter 195. Since the display 110, the communicator 120, the processor 130, the first motor 140, and the memory 150 has been described in FIG. 2A, overlapping descriptions may be omitted.

The first support 160 may be an element supporting an element of the display apparatus 100. In an embodiment, the first support 160 may support an element of the display apparatus 100 in a horizontal direction of the surface. Further, the first support 160 may include the second motor 180 capable of rotating the second support 170 in the yaw direction.

The second support 170 may be an element supporting the display 110 and the first motor 140 for the display 110 to rotate (or, pivot) at the top surface of the first support. In an embodiment, the second support 170 may support the display 110 and the first motor 140 for the display 110 to freely rotate (or, pivot) three-dimensionally in a vertical direction of the surface from the top surface of the first support 160.

The second motor 180 may be an element capable of rotating the second support 170 about the yaw-axis direction by the control of the processor 130. The second motor 180 may be attached to the top surface of the first support and rotate (or, pivot) the second support 170 by the control of the processor 130, but this is merely one embodiment.

The speaker 190 may be configured to not only output various audio data performed with various processing operations such as decoding or amplifying, and noise filtering by the audio processor (not shown), but also to output various notification sounds or voice messages. For example, the speaker 190 may output a message inquiring whether to rotate (or, pivot) the display 110 in voice form by the control of the processor 130. The configuration for outputting audio may be variously implemented in not only speakers 190 but also based on elements of the display apparatus 100.

The inputter 195 may receive a user input for controlling the display apparatus 100. For example, the inputter 195 may include a touch panel for receiving user touch input using a hand of the user or a stylus pen, a button for receiving user manipulation input, and the like. In addition, the inputter 195 may also be implemented as other input apparatuses (e.g., a remote control 400, a virtual keyboard, a mouse, a motion inputter, etc.).

In the embodiment, when the user command to not rotate (or, pivot) the display 110 is input, the inputter 195 may transmit a signal corresponding to the input user command to the processor 130.

Figure 3A:
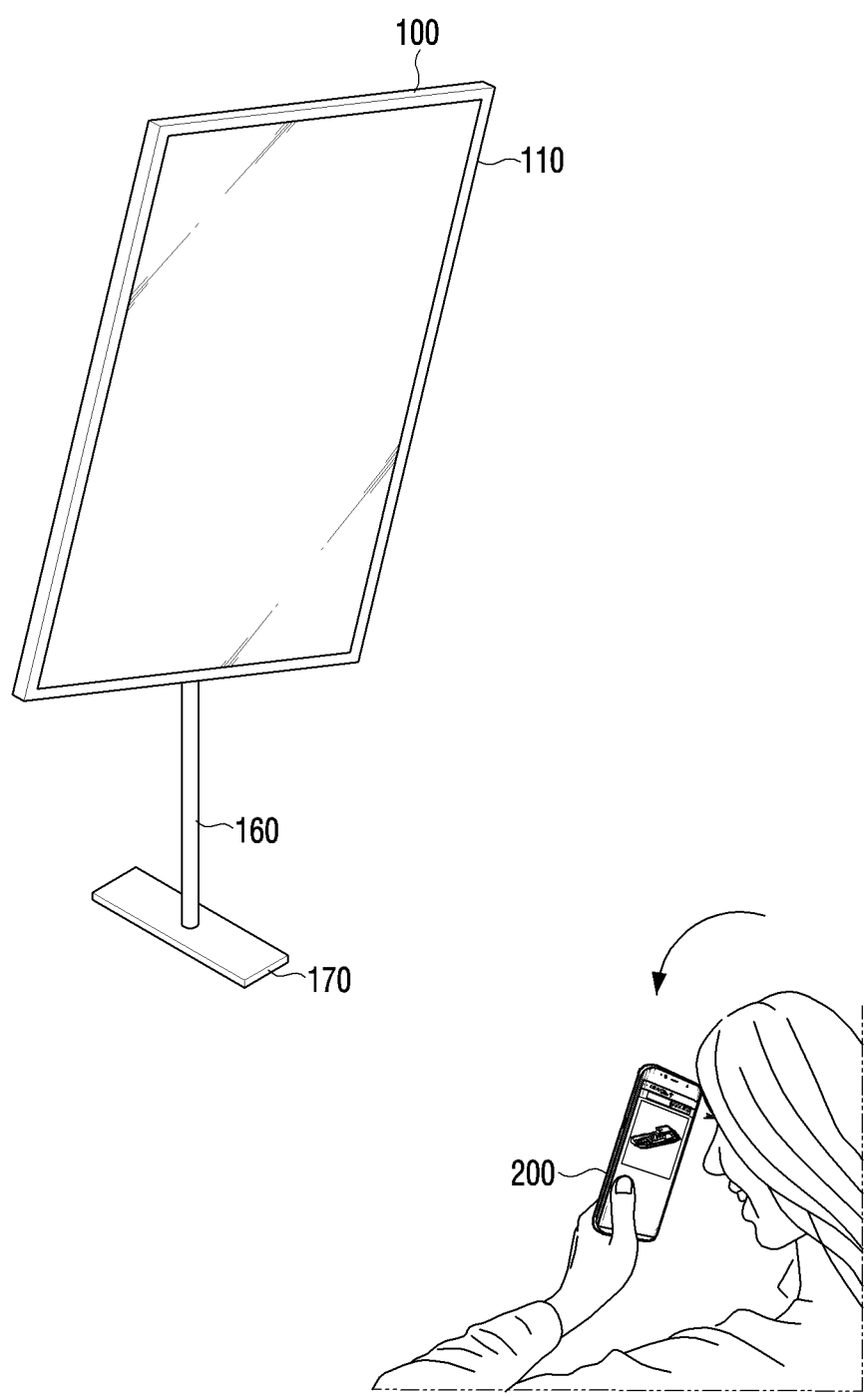
FIG. 3A is a diagram illustrating an operation of a display apparatus rotating a display based on facial angle information of user according to an embodiment of the disclosure.
Figure 3B:
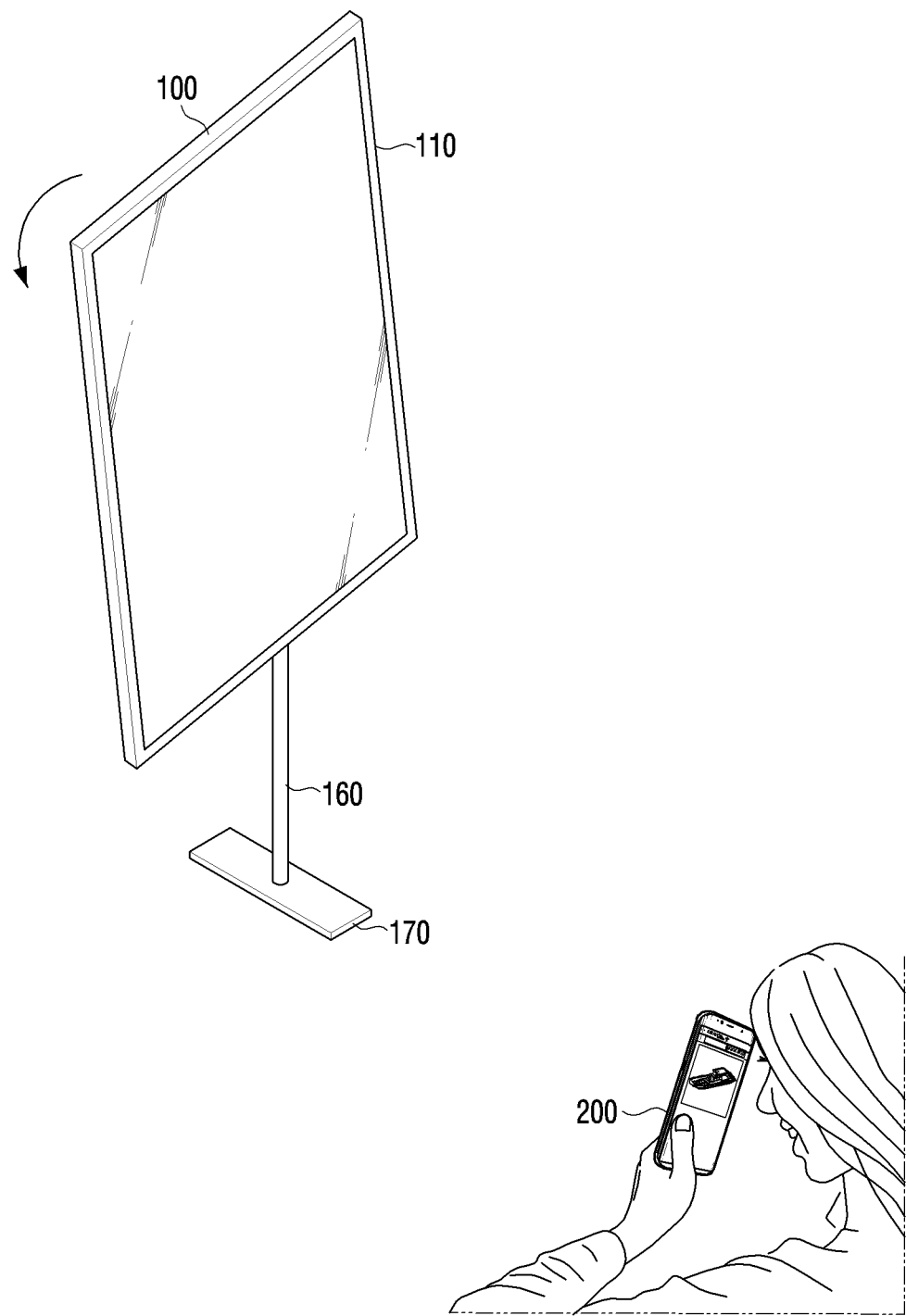
FIG. 3B is a diagram illustrating an operation of a display apparatus rotating a display based on facial angle information of user according to an embodiment of the disclosure.

FIGS. 3A to 3B are diagrams illustrating an embodiment of the display apparatus 100 rotating the display 110 based on information on facial angle of the user received from the user terminal apparatus 200 according to an embodiment of the disclosure. Specifically, FIG. 3A is a diagram illustrating an embodiment of the display 110 receiving information that the facial angle of the user has been changed from the user terminal apparatus 200 after the display 110 has been rotated based on the location information and the position information, as illustrated in FIG. 1C.

After rotating the display 110 about the axis direction of the angle identified as exceeding the threshold by the identified angle, the display apparatus 100 may obtain information on the facial angle of the user from the user terminal apparatus 200. The user terminal apparatus 200 may detect and obtain that the facial angle of the user has been changed after the display has been rotated through the camera and the like included in the user terminal apparatus 200. The user terminal apparatus 200 may then transmit information on whether the facial angle of the user has rotated by an angle of a certain degree in a specific direction of the yaw direction, the roll direction and the pitch direction to the display apparatus 100 after the display has been rotated 110. Accordingly, the display apparatus 100 may receive information on the facial angle of the user from the user terminal apparatus 200.

For example, as illustrated in FIG. 3A, the user terminal apparatus 200 may detect and obtain that the facial angle of the user has been rotated by a fourth angle in the roll direction after the display has been rotated through the camera and the like. The user terminal apparatus 200 may then transmit information on the detected and obtained face of the user to the display apparatus 100. Accordingly, the display apparatus 100 may receive information that the face of the user has been rotated about the roll-axis direction by the fourth angle from the user terminal apparatus 200.

Further, the display apparatus 100 may control the first motor to rotate (or, pivot) the display based on received information on the facial angle of the user. For example, based on receiving information that the face of the user has been rotated about the roll-axis direction by the fourth angle after the display has been rotated, the display apparatus 100 may identify whether the fourth angle exceeds the fourth threshold. The fourth threshold may be a pre-set value, and may be variously changed according to the type of the display apparatus 100. In addition, the fourth threshold may be changed based on the user command. As illustrated in FIG. 3B, when the fourth angle is identified as exceeding the fourth threshold, the display apparatus 100 may rotate (or, pivot) the display 100 about the roll-axis direction by the fourth angle.

Referring to FIGS. 3A and 3B, an embodiment of the display apparatus 100 having received information that the facial angle of the user has been rotated about the roll-axis direction has been described, but this is merely one embodiment. That is, the display apparatus 100 may receive information that the facial angle of the user has been rotated about the yaw-axis direction, the roll-axis direction, and the pitch-axis direction from the user terminal apparatus 200. The display apparatus 100 may, at this time, identify whether the rotated angle in each direction exceeds the threshold corresponding to each direction. The display apparatus 100 may then rotate (or, pivot) the display 110 about the axis direction of the angle identified as exceeding the threshold by the identified angle.

Figure 4:
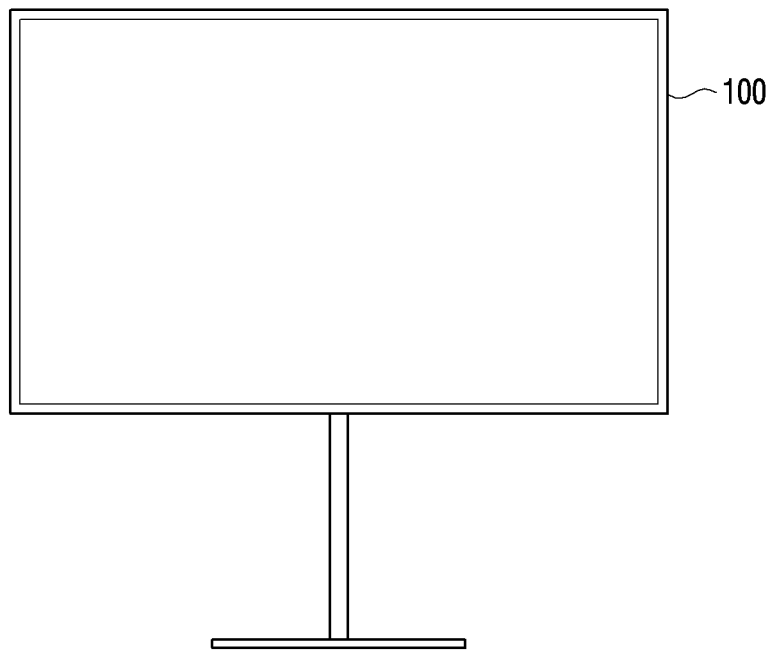
FIG. 4 is a diagram illustrating an operation of a display apparatus according to an embodiment of the disclosure.
Figure 4:
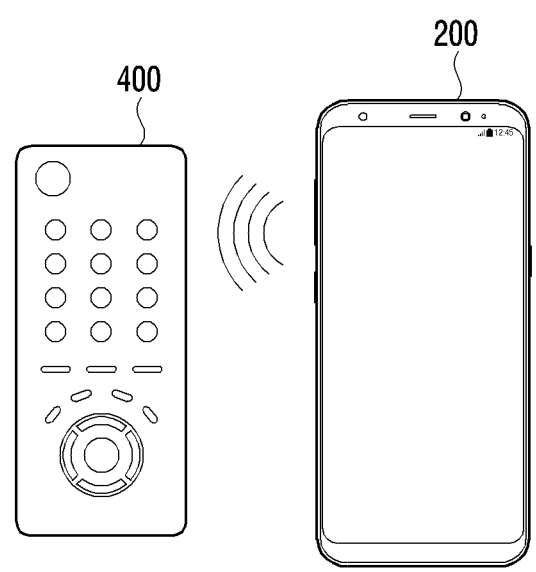

FIG. 4 is a diagram illustrating an operation of the display apparatus 100 according to an embodiment of the disclosure. Specifically, the diagram illustrates an operation of the display apparatus 100, when the user terminal apparatus 200 is tagged to the NFC tag storing information on the display apparatus 100 included in the remote control 400 controlling the display apparatus 100.

For example, based on the user terminal apparatus 200 being tagged to the NFC tag storing signals requesting information (e.g., MAC address of display apparatus 100, etc.) on the display apparatus 100 included in the remote control 400, and the location information and the position information of the user terminal apparatus 200, the user terminal apparatus 200 may receive the RF signal containing the information stored in the NFC tag. The display apparatus 100 may then, while performing communication connection with the user terminal apparatus 200 based on information on the display apparatus 100 received by the user terminal apparatus 200, receive the location information and the position information of the user terminal apparatus 200 simultaneously or within the threshold time range.

According to another embodiment, even when the NFC tag stored with information of the display apparatus 100 is attached externally and not to the display apparatus 100 or the remote control connected with the display apparatus 100, the display apparatus 100 may operate the same as the embodiment described above. That is, because the user terminal apparatus 200 is tagged to the NFC tag attached externally, the display apparatus 100 may receive the location information and the position information of the user terminal apparatus 200 from the user terminal apparatus 200 while performing communication connection with the user terminal apparatus 200.

In the embodiments described above, although it has been described that tagging of the user terminal apparatus 200 has been detected through the NFC tag including information on the display apparatus 100 to perform communication connection with the user terminal apparatus 200, this is merely one embodiment, and the display apparatus 100 may also detect vibration when the user terminal apparatus 200 is tagged the display apparatus 100 through the acceleration sensor to perform communication connection with the user terminal apparatus 200. In this case, the acceleration sensor may be provided in the display apparatus 100 or the user terminal apparatus 200, or both the display apparatus 100 and the user terminal apparatus 200. In the embodiment to which the acceleration sensor is provided to both the display apparatus 100 and the user terminal apparatus 200, when the user terminal apparatus 200 is tagged to the display apparatus 100, the acceleration sensor in the display apparatus 100 may detect an impact of the threshold value or more. The display apparatus 100 that detected the impact of the threshold value or more may broadcast a pairing signal to the surrounding devices immediately upon detection. The acceleration sensor in the user terminal apparatus 200 may also, at this time, detect the impact of a threshold value or more. The user terminal apparatus 200 may perform the pairing connection with the electronic device by entering the BLE pairing mode upon detecting the impact of the threshold value or more.

Figure 5:
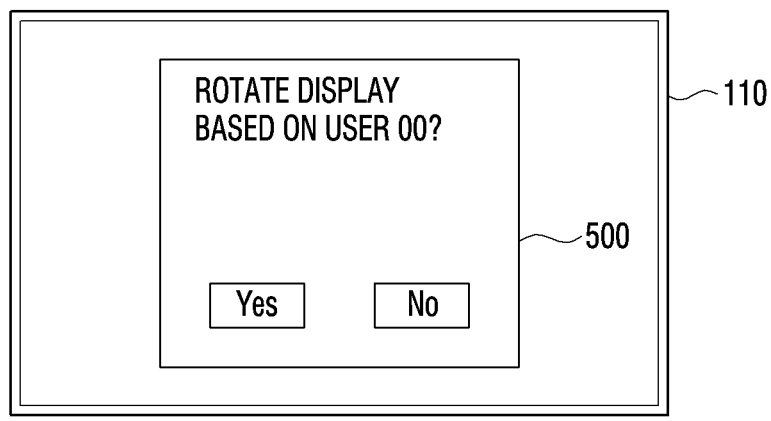
FIG. 5 is a diagram illustrating a UI screen displayed in a display apparatus according to an embodiment of the disclosure.
Figure 5:
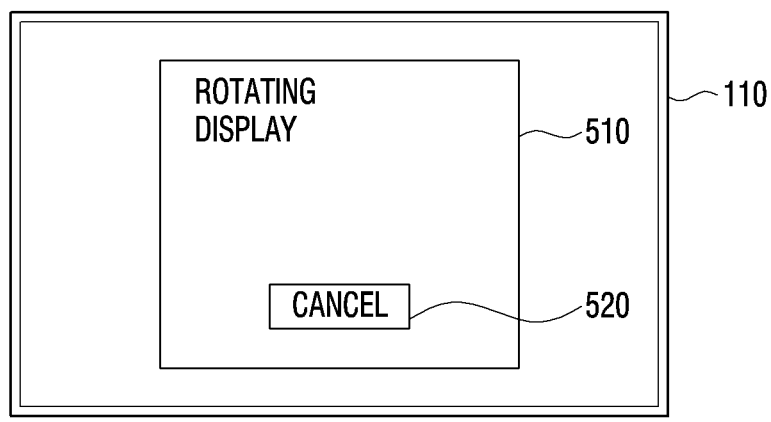

FIG. 5 is a diagram illustrating a UI screen displayed in the display apparatus 100 according to an embodiment of the disclosure. However, the UI illustrated in FIG. 5 is merely one embodiment, and the UI may be variously implemented based on the type of the display apparatus 100 or by the user command.

In an embodiment, as illustrated in FIG. 5, (a) the display apparatus 100 may display a UI 500 inquiring whether to rotate (or, pivot) the display 110. Specifically, when at least one of the first angle of the yaw direction, the second angle of the roll direction and the third angle of the pitch direction between the user terminal apparatus 200 and the display 110 is identified as exceeding the threshold based on the location information and the position information of the user terminal apparatus 200, the display apparatus 100 may display a UI 500 inquiring whether to rotate (or, pivot) the display 110.

In still another embodiment, when change in facial angle of the user is identified as exceeding the threshold through information on the facial angle of the user received from the user terminal apparatus 200 after the display 110 has been rotated, the display apparatus 100 may display the UI inquiring whether the display 110 is to be rotated.

In an embodiment, as illustrated in FIG. 5, (b) the display apparatus 100 may display a UI 510 capable of controlling the rotation of the display 110. For example, when the user touches an icon 820 to stop rotation while the display 110 is being rotated, the display apparatus 100 may transmit a signal to maintain the current angle of the display 110 to the display apparatus 100.

Figure 6:
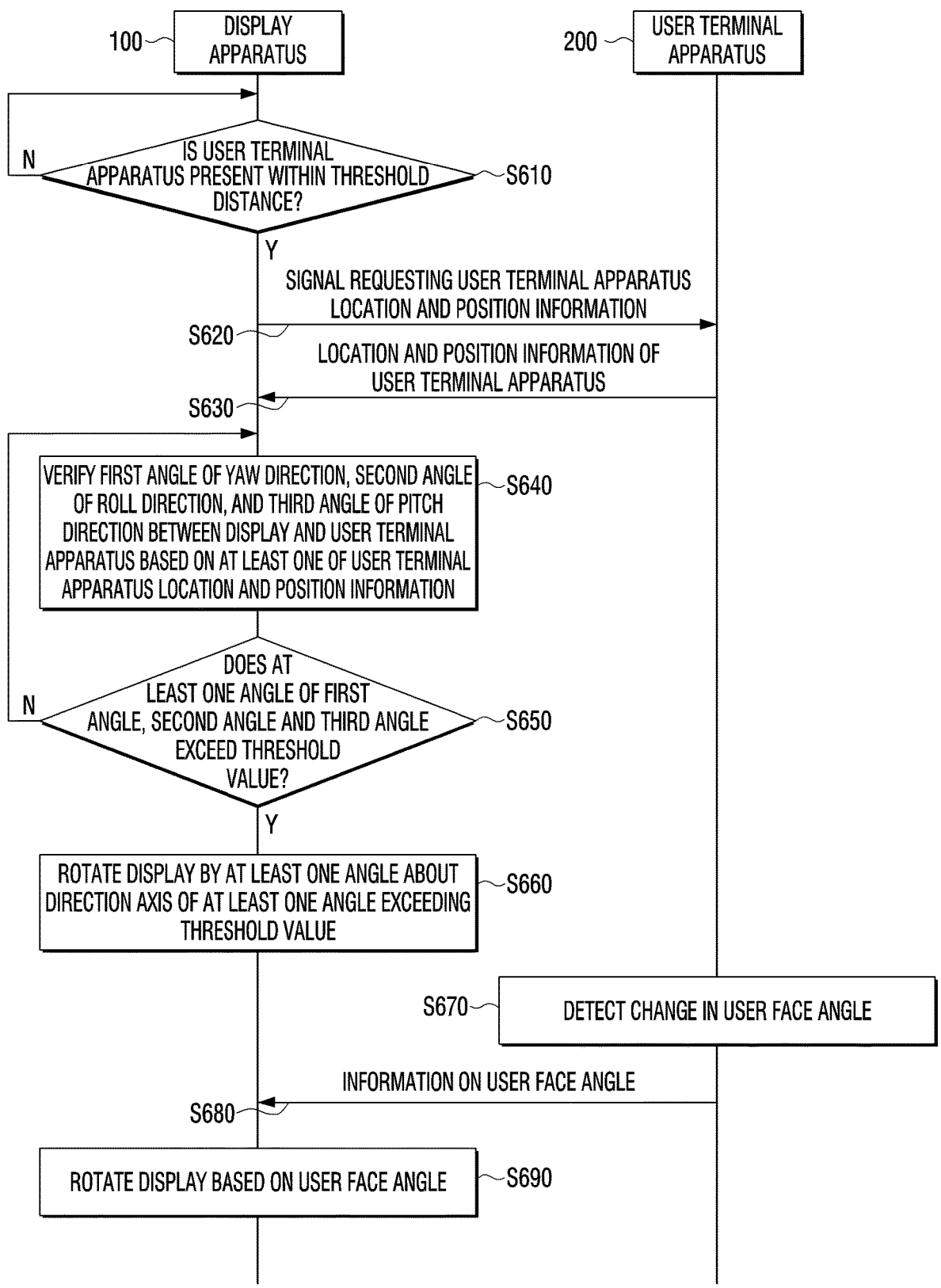
FIG. 6 is a sequence diagram illustrating an operation of a display apparatus and a user terminal apparatus according to an embodiment of the disclosure.

FIG. 6 is a sequence diagram illustrating an operation of the display apparatus 100 and the user terminal apparatus 200 according to an embodiment of the disclosure.

First, the display apparatus 100 may identify whether the user terminal apparatus 200 is present within the threshold distance of the display apparatus 100 (S610). For example, the display apparatus 100 may user the Bluetooth Beacon to identify the user terminal apparatus 200 present within the threshold distance. Next, when the user terminal apparatus 200 is identified as present within the threshold distance, the display apparatus 100 may transmit a signal requesting the location information and the position information of the user terminal apparatus to the user terminal apparatus 200 (S620). Based on identifying the user terminal apparatus 200 using the Bluetooth Beacon, the display apparatus 100 may estimate the location of the user terminal apparatus 200 through a physical quantity such as a strength of the signal received in the Bluetooth Beacon, time taken until the signal is reflected from the user terminal apparatus 200 and returned, and the like.

Based on identifying the user terminal apparatus 200 within the threshold distance, the display apparatus 100 may transmit a signal requesting the location information and the position information to the user terminal apparatus 200 simultaneously or within the threshold time range. The display apparatus 100 may then receive the location information and the position information from the user terminal apparatus 200 (S630).

Further, the display apparatus 100 may verify the first angle of the yaw direction, the second angle of the roll direction, and the third angle of the pitch direction between the display 110 and the user terminal apparatus 200 based on at least one of the location information and the position information (S640). Because the method of verifying the angle of each direction has been described above, overlapping descriptions may be omitted. Based on at least one angle of the first angle, the second angle, and the third angle being identified as not exceeding the threshold, the display apparatus 100 may maintain the angle of the current display 110. Further, after the threshold time, based on receiving the location information and the position information of the user terminal apparatus 200 changed from the user terminal apparatus 200, the display apparatus 100 may identify whether the angle of each direction exceeds the threshold based on the received information.

The display apparatus 100 may then identify whether the at least one angle of the first angle, the second angle and the third angle exceeds the threshold (S650). The threshold corresponding to each angle may be the same value, but this is merely one embodiment, and the threshold corresponding to each angle may be different. Further, the display apparatus 100 may rotate (or, pivot) the display 110 about the axis direction of at least one angle exceeding the threshold by at least one angle (S660).

After the display 110 is rotated, the user terminal apparatus 200 may detect the change in the facial angle of the user (S670). For example, after the display 110 is rotated, the user terminal apparatus 200 may detect whether the facial angle of the user has been changed using the camera, and the like. The user terminal apparatus 200 may then transmit information on the facial angle of the user to the display apparatus 100 (S680). The information on the facial angle of the user may include information on the face of the user rotating about the yaw-axis direction, the roll-axis direction, and the pitch-axis direction by the specific angle after the display 110 has been rotated.

The display apparatus 100 may then rotate (or, pivot) the display 110 based on information on the facial angle of the user received from the user terminal apparatus 200 (S690). Because the embodiment related thereto has been described with reference to FIGS. 3A and 3B, overlapping descriptions may be omitted.

Figure 7:
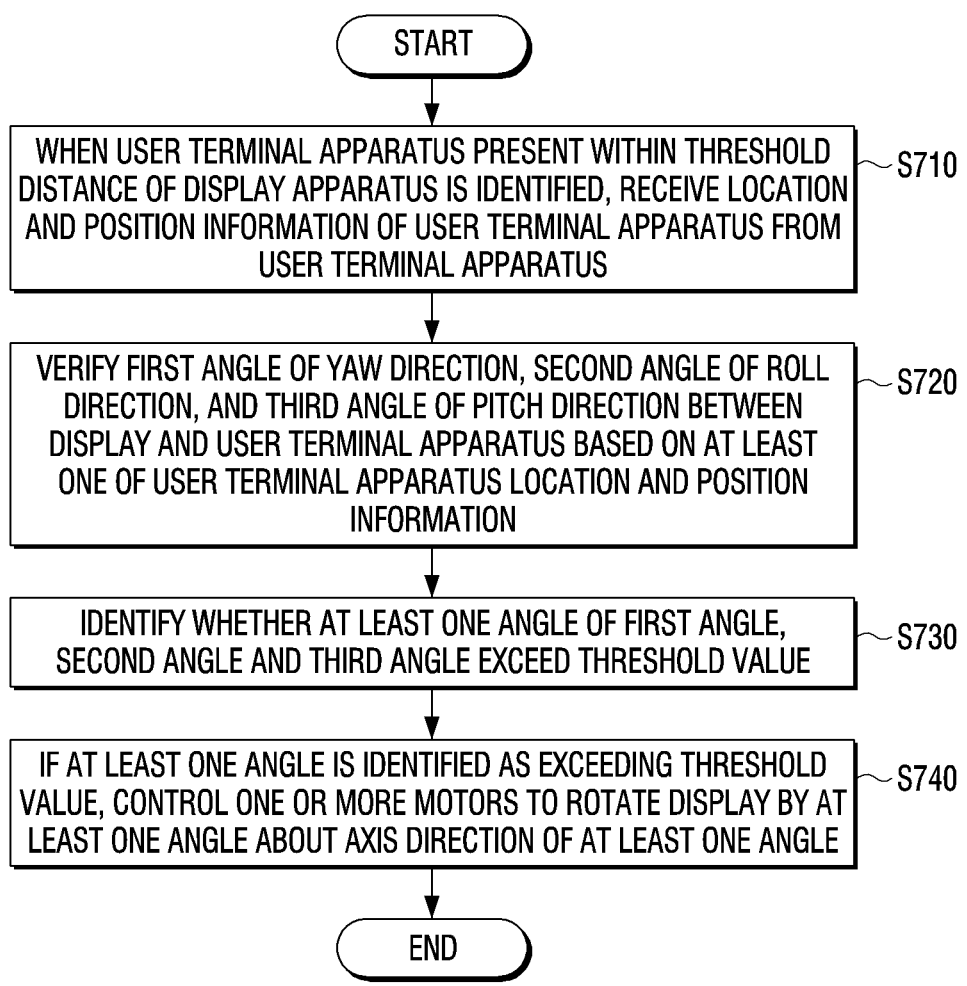
FIG. 7 is a flowchart illustrating a control method of a display apparatus according to an embodiment of the disclosure.

FIG. 7 is a flowchart illustrating a control method of a display apparatus 100 according to an embodiment of the disclosure.

The display apparatus 100 may identify the user terminal apparatus 200 present within the threshold distance of the display apparatus 100, and receive the location information and the position information of the user terminal apparatus 200 from the user terminal apparatus 200 (S710).

Further, the display apparatus 100 may verify the first angle of the yaw direction, the second angle of the roll direction, and the third angle of the pitch direction between the display 110 and the user terminal apparatus 200 based on at least one of the location information and the position information (S720). For example, the display apparatus 100 may user the location of the user terminal apparatus 200 to verify the first angle of the yaw direction between the display 110 and the user terminal apparatus 200.

Further, the display apparatus 100 may identify the roll angle and the pitch angle of the user terminal apparatus 200 through the position information. The display apparatus 100 may then use the identified roll angle and the identified pitch angle to verify the second angle of the roll direction and the third angle of the pitch direction between the display 110 and the user terminal apparatus 200.

Further, the display apparatus 100 may identify whether at least one angle of the first angle, the second angle, and the third angle exceeds the threshold (S730). When at least one angle is identified as exceeding the threshold, the display apparatus 100 may then control the first motor to rotate (or, pivot) the display 110 about the axis direction of at least one angle by the difference of at least one angle (S740). When the first angle of the yaw direction is identified as exceeding the threshold, the display apparatus 100 may rotate (or, pivot) the second support about the yaw-axis direction by the first angle.

Further, the display apparatus may rotate (or, pivot) the display 110 in the order of the yaw direction, the roll direction, and the pitch direction, but this is merely one embodiment, and the display 110 may be rotated in various order.

According to the various embodiments described above, because the display apparatus rotates (or, pivots) the display based on information received from the user terminal apparatus, the user may view the display apparatus at an optimum angle without having to move.

In addition, because the display apparatus rotate (or, pivot)s three-dimensionally and not just horizontally or vertically, the user may effectively view the display apparatus in any position.

The various embodiments described above may be implemented as a software including instructions stored on a machine-readable storage media readable by a machine (e.g., computer). The machine, as an apparatus capable of calling an instruction stored in a storage medium and operating according to the called instruction, may include an electronic apparatus (e.g., display apparatus 100) according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. Herein, the 'non-transitory storage medium' may not include a signal and is tangible, but does not distinguish data being semi-permanently or temporarily stored in a storage medium According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. Play Store™). In the case of on-line distribution, at least a portion of the computer program product (e.g., downloadable app) may be at least temporarily stored in a storage medium such as a manufacturer's server, a server of an application store, or a memory of a relay server, or temporarily generated.

Each of the elements (e.g., a module or a program) according to the various embodiments described above may be composed of a single entity or a plurality of entities, and some sub-elements of the abovementioned sub-elements may be omitted, or another sub-element may be further included in the various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operation.

What is claimed is:

1. A display apparatus comprising:
a communicator including circuitry;
a display;
one or more motors to move the display;
a memory; and
a processor configured to:
through the communicator, identify a user terminal apparatus present within a threshold distance of the display apparatus,
receive an orientation information obtained through a sensor of the identified user terminal apparatus according to a movement of a display surface of the user terminal apparatus from the identified user terminal apparatus,
identify a first angle of a yaw direction, a second angle of a roll direction, and a third angle of a pitch direction between the display and the display surface of the user terminal apparatus based on the orientation information of the user terminal apparatus;
identify whether at least one of the first angle, the second angle, and the third angle exceeds a threshold; and
based on the at least one of the first angle, the second angle, and the third angle being identified as exceeding the threshold, control the one or more motors to move the display to correspond to the movement of the display surface of the user terminal apparatus based on the orientation information of the user terminal apparatus.

2. The display apparatus of claim 1, wherein the threshold is a first threshold value and the processor is configured to:
identify the first angle of the yaw direction between the display and the user terminal apparatus using a location of the user terminal apparatus according to the orientation information, and
based on the first angle exceeding the first threshold value, control the one or more motors to pivot the display about a yaw-axis direction by the at least one move angle.

3. The display apparatus of claim 1, wherein the processor is configured to:
identify a roll angle and a pitch angle of the user terminal apparatus using the orientation information,
identify the second angle of the roll direction between the display and the user terminal apparatus using the identified roll angle, and
identify the third angle of the pitch direction between the display and the user terminal apparatus using the identified pitch angle.

4. The display apparatus of claim 3, wherein the threshold includes a first threshold value, a second threshold value and a third threshold value and the processor is configured to:
control the one or more motors to pivot the display about a roll-axis direction based on the second angle exceeding the second threshold value, and
control the one or more motors to pivot the display about a pitch-axis direction based on the third angle exceeding the third threshold value.

5. The display apparatus of claim 2, further comprising:
a first support;
a second support to support the display;
wherein the one or more motors include:
a first motor for the display to pivot at a top surface of the first support; and
a second motor to rotate the second support included in the first support,
wherein the processor is configured to, based on the first angle being identified as exceeding the first threshold value, control the second motor to pivot the second support about a yaw-axis direction by the at least one move angle.

6. The display apparatus of claim 1, wherein the processor is configured to, based on the at least one of the first angle, the second angle, and the third angle being identified as exceeding the threshold, control the display to display a user interface (UI) inquiring whether to pivot the display.

7. The display apparatus of claim 1, wherein the processor is configured to, based on a user command to fix the display being input after the display is pivoted, control the one or more motors to maintain an angle of the pivoted display.

8. The display apparatus of claim 1, wherein the processor is configured to, based on the user terminal apparatus being identified as exceeding the threshold distance of the display apparatus, control the display to display a pre-set idle screen.

9. The display apparatus of claim 1, wherein the processor is configured to:
receive information on a facial angle of a user from the user terminal apparatus through the communicator after the display is pivoted, and
control a first motor among the one or more motors to pivot the display based on information on the facial angle of the user.

10. The display apparatus of claim 1, wherein the processor is configured to, based on a location of the user terminal apparatus being maintained during a pre-set time after the user terminal apparatus is identified as being present within the threshold distance of the display apparatus, control the one or more motors to pivot the display about the axis direction of the at least one of the first angle, the second angle, and the third angle identified as exceeding the threshold by the at least one move angle.

11. A control method of a display apparatus including one or more motors to move a display, the method comprising:
identifying a user terminal apparatus present within a threshold distance of the display apparatus;
receiving an orientation information obtained through a sensor of the identified user terminal apparatus according to a movement of a display surface of the user terminal apparatus from the identified user terminal apparatus;
identifying a first angle of a yaw direction, a second angle of a roll direction, and a third angle of a pitch direction between the display and the display surface of the user terminal apparatus based on the orientation information of the user terminal apparatus;
identifying whether at least one of the first angle, the second angle, and the third angle exceeds a threshold; and
based on the at least one of the first angle, the second angle, and the third angle being identified as exceeding the threshold, controlling the one or more motors to move the display to correspond to the movement of the display surface of the user terminal apparatus based on the orientation information of the user terminal apparatus.

12. The control method of claim 11, wherein the threshold is a first threshold value and the method comprises:
identifying the first angle of the yaw direction between the display and the user terminal apparatus using a location of the user terminal apparatus according to the orientation information; and
based on the first angle being identified as exceeding the first threshold value, controlling the one or more motors to pivot the display about a yaw-axis direction by the at least one move angle.

13. The control method of claim 11, wherein the method comprises:
identifying a roll angle and a pitch angle of the user terminal apparatus using the orientation information; and
identifying the second angle of the roll direction between the display and the user terminal apparatus using the identified roll angle, and identifying the third angle of the pitch direction between the display and the user terminal apparatus using the identified pitch angle.

14. The control method of claim 13, wherein the threshold includes a first threshold value, a second threshold value and a third threshold value and the controlling comprises:
based on the second angle being identified as exceeding the second threshold value, controlling the one or more motors to pivot the display about a roll-axis direction, and
based on the third angle being identified as exceeding the third threshold value, controlling the one or more motors to pivot the display about a pitch-axis direction.

15. The control method of claim 12, wherein the controlling comprises, based on the first angle being identified as exceeding the first threshold value, controlling a second motor comprised in a first support to pivot a second support supporting the display about a yaw-axis direction for the display to pivot at a top surface of the first support by a difference according to the at least one move angle.

16. The control method of claim 11, wherein the controlling comprises, based on the at least one of the first angle, the second angle, and the third angle being identified as exceeding the threshold, displaying a user interface (UI) inquiring whether to pivot the display.

17. The control method of claim 11, wherein the controlling comprises, based on a user command to fix the display being input after the display is pivoted, controlling the one or more motors to maintain an angle of the pivoted display.

18. The control method of claim 11, wherein the controlling comprises, based on the user terminal apparatus being identified as exceeding the threshold distance of the display apparatus, displaying a pre-set idle screen.

19. The control method of claim 11, wherein the controlling comprises:
receiving information on a facial angle of a user from the user terminal apparatus after the display is pivoted; and
controlling a first motor among the one or more motors to pivot the display based on information on the facial angle of the user.

20. The control method of claim 11, wherein the controlling comprises, based on a location of the user terminal apparatus being maintained during a pre-set time after the user terminal apparatus is identified as being present within the threshold distance of the display apparatus, controlling the one or more motors to pivot the display about the axis direction of the at least one of the first angle, the second angle, and the third angle identified as exceeding the threshold by the at least one move angle.

* * * * *